Dec. 30, 1952     D. G. UNTHANK     2,623,565

TANK

Filed May 19, 1950     3 Sheets-Sheet 1

Inventor:
Douglas G. Unthank
By: Young, Emery & Thompson
Attys.

Dec. 30, 1952 D. G. UNTHANK 2,623,565
TANK
Filed May 19, 1950 3 Sheets-Sheet 2

Inventor:
DOUGLAS G. UNTHANK
By Young, Emery & Thompson
Att'ys.

Dec. 30, 1952　　　　D. G. UNTHANK　　　　2,623,565
TANK
Filed May 19, 1950　　　　　　　　　　　　3 Sheets-Sheet 3
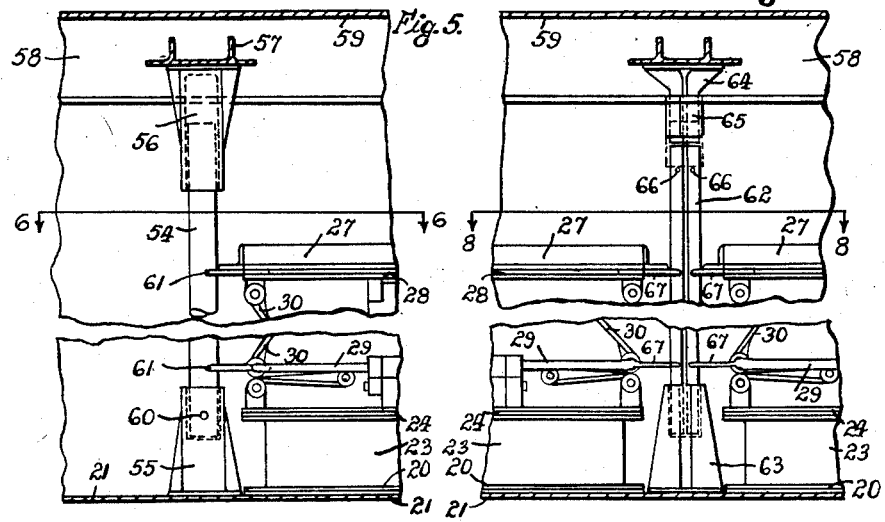
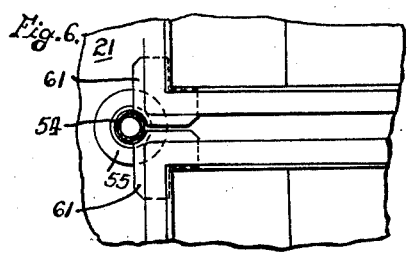
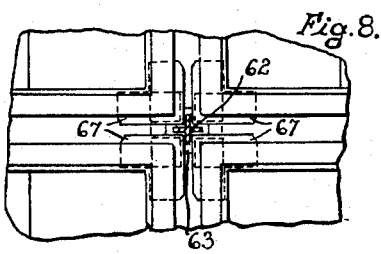
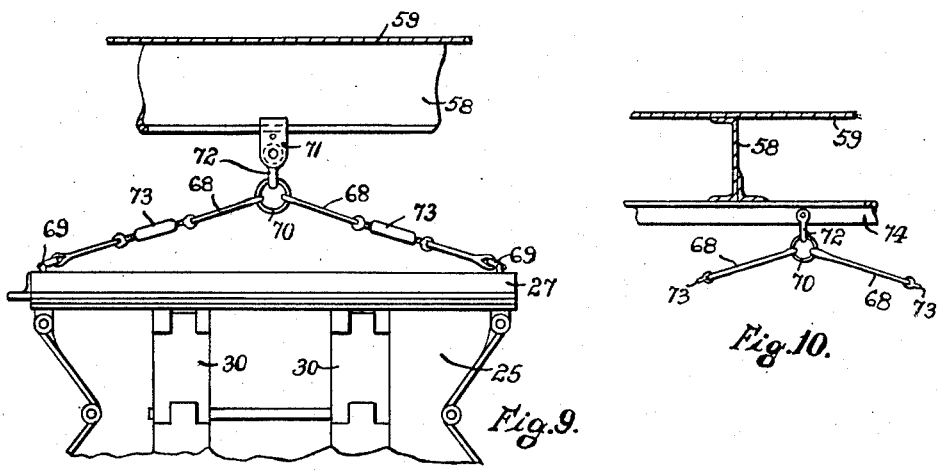
Inventor:
Douglas G. Unthank
By: Young, Emery & Thompson
Attys.

Patented Dec. 30, 1952

2,623,565

UNITED STATES PATENT OFFICE 2,623,565

TANK

Douglas George Unthank, London, England

Application May 19, 1950, Serial No. 162,907
In Great Britain May 23, 1949

4 Claims. (Cl. 150—0.5)

This invention relates to tanks, and an object of the invention is to provide a collapsible tank suitable for use for example for the transport of liquids in ships' holds.

A further object is to enable a ship or other vehicle to carry dry cargo on say an outward trip and liquid cargo in bulk on the return trip.

According to this invention a collapsible closed tank is straight-sided in plan and includes a rigid bottom and a rigid top connected together by side walls capable of being folded into a plurality of superimposed pleats, rigid horizontal frames adapted to establish the outer folds of the pleats, and means for establishing the inner folds of the pleats and for maintaining the frames in vertical alignment.

Preferably the portion of the tank side walls adjacent the tank bottom is rigid and provided with a connection for a filling and discharging line communicating with a pipe within the tank and having its mouth near to the bottom of the tank.

The means for maintaining the frames in vertical alignment may take the form of pairs of folding members distributed around the tank between each adjacent two frames, the two members of each pair being hinged together and also hinged respectively to the two frames about horizontal axes, the arrangement being such that the members are constrained to move inwards when the tank collapses.

The tank side walls may include at least one sheet of fabric-reinforced liquid-proof material and be anchored to the frames at the outer fold lines, the mutual hinge of the folding members of each pair serving to establish an inner fold line as the tank collapses. The tank may also include at least one sheet of canvas.

The tank is preferably rectangular or hexagonal in plan so that several such tanks can be placed side to side to form a cellular assembly.

One example of the invention, as applied to tanks suitable for use in the bulk transport of edible oils by sea will now be described by way of example, with reference to the accompanying drawings wherein:

Figure 5 is a view in elevation showing one type of stanchion for supporting the tanks when in the extended position.

Figure 6 is a section taken on the line 6—6 in Figure 5.

Figure 7 is a similar view to Figure 5 and shows another type of stanchion.

Figure 8 is a section taken on the line 8—8 in Figure 7.

Figure 9 is a view in elevation showing a sling support for the tanks when in the extended position.

Figure 10 is a similar view showing another method of fastening a sling support to the roof of the hold.

Figure 1:
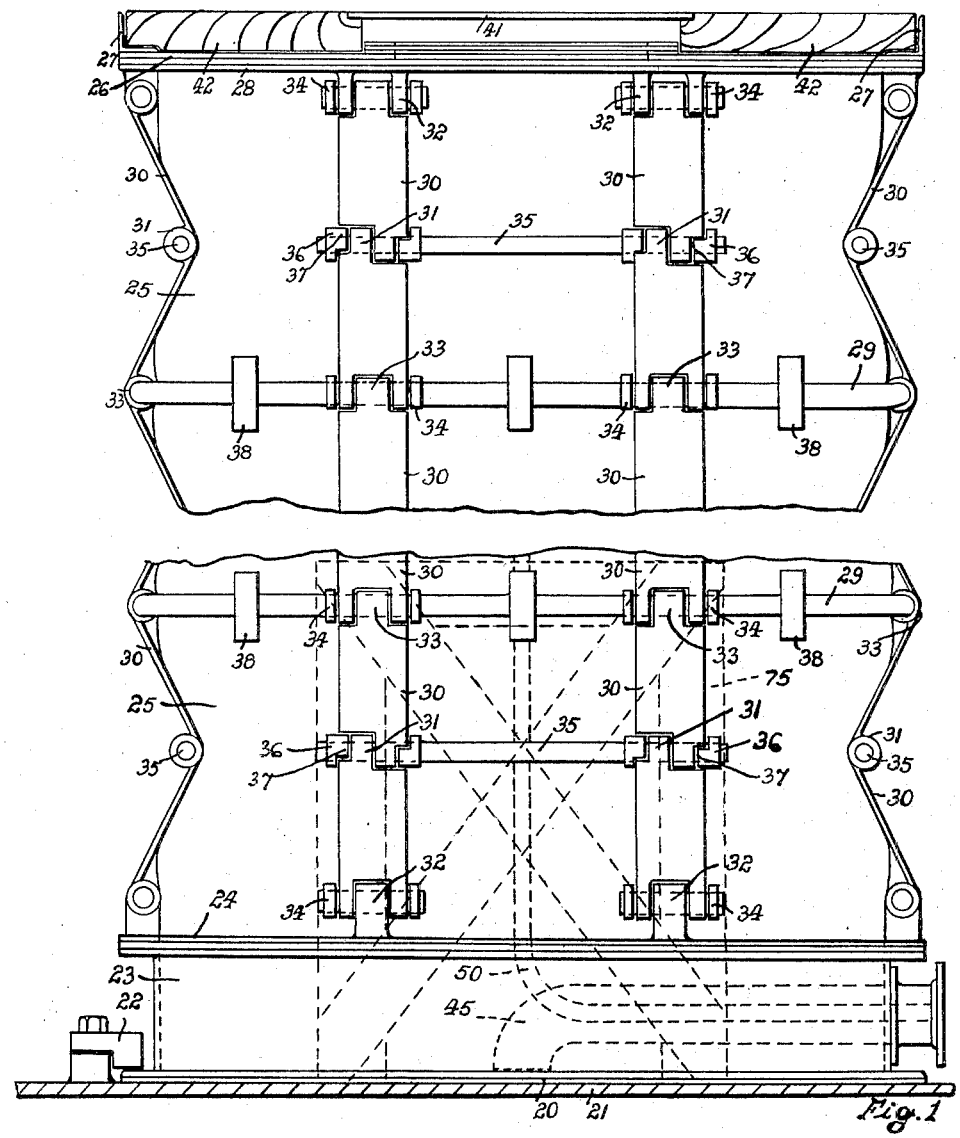
Figure 1 is a view in elevation of a tank in the extended position with one of the reinforcing bars for the tank top removed.
Figure 2:
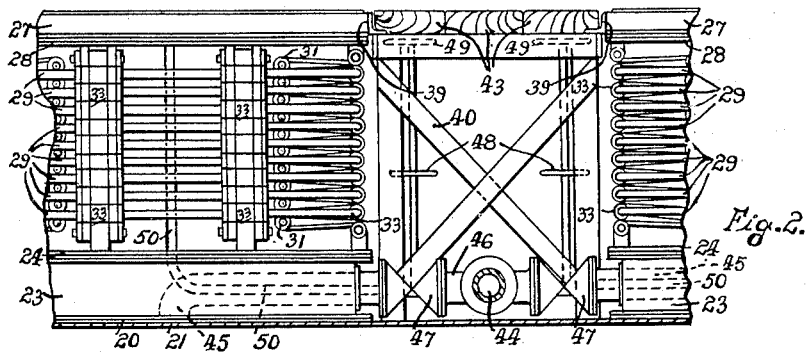
Figure 2 is a section in elevation of tanks in the collapsed position with the side walls removed and taken along the line 2—2 in Figure 3.
Figure 3:
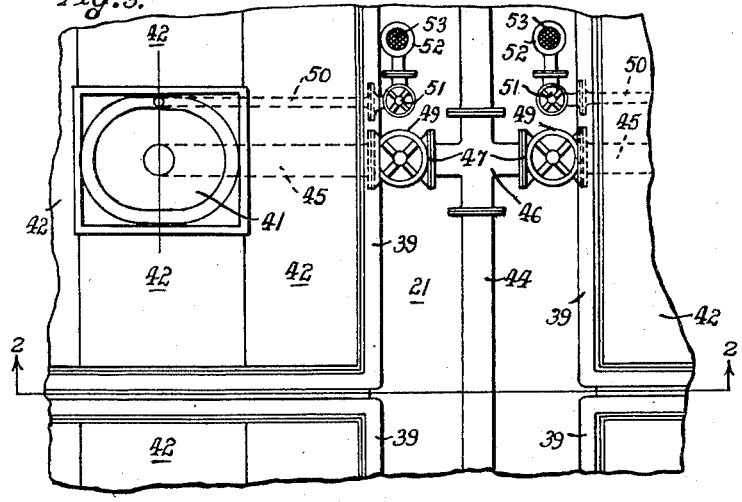
Figure 3 is a plan view of the tanks shown in Figure 2 with a cat-walk and its supporting frames removed.

The tank is square in plan and has a steel plate bottom 20 fixed to the floor 21 of a hold of the ship (e. g. temporarily by securing-lugs 22 or permanently by riveting or welding). The bottom plate is reinforced at its edges with channel bars 23 which, together with a clamping frame 24, serve as attachment borders for the bottom edges of the tank side walls 25. A steel plate 26 reinforced at its edges with angle bars 27 forms the top of the tank, the reinforcing bars and a clamping frame 28 serving as attachment borders for the top edges of the tank side walls 25. The tank walls consist of an inner sheet of fabric-reinforced flexible material resistant to penetration of the liquid cargo, e. g. synthetic rubber material and two outer sheets of strong canvas.

Figure 4:
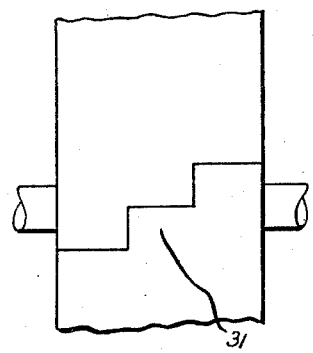
Figure 4 is a plan view of a hinge.

Square frames 29 consisting of lengths of steel tube bent to shape and slightly smaller than the top and bottom of the tank are placed one above the other between the top and bottom plates. In this example nine such frames are provided for each tank. Each frame is connected to the adjacent two frames by eight pairs of linking plates 30 hinged together at 31, two pairs of plates being disposed on each side of the frame. The uppermost and the lowermost linking plates 30 are hinged to lugs 32 welded to the top and bottom clamping frames respectively. The adjoining pairs of plates are hinged together at 33 about the intervening frame 29 which serves as a pivot pin. Collars 34 on the frames prevent movement of the clamping plates along the frames. Each pair of hinges 31 on one side of the tank is provided with a single pivot pin 35 which assists the associated plates 30 to fold a pleat in the tank wall as it is collapsed. This pivot pin is fitted with collars 36 having projections 37 which fit into recesses in their respective linking plates 30 and prevent the hinges from opening beyond a position in which the plates are inclined slightly inwards. A form of hinge 31 which enables plain collars 34 to be used instead of the shaped collars 36 is shown in Figure 4. The tank is pleated to follow the contour of the linking plates 30 so that as it collapses it is folded by the plates in bellows fashion into a number of superimposed pleats. It is necessary in this example to provide some support for the tank tops when the tanks are in the collapsed position. This may be done by fixing support members consisting of extra bars 39 to the angle bars 27 so that the extra bars 39 engage cat-walk frames 40 when the tanks are collapsed. Alternatively, there may be provided a truss support structure 75 (Fig. 1) standing on the bottom of the tank and adapted to be engaged directly by the tank top when the tank is in the collapsed position. The tank walls are anchored to the frames 29 by loops 38 (shown only in Figure 1).

As the tank is filled it expands upwards. Referring to Figure 1, when in an extended position the tank is given stability in a direction perpendicular to the plane of the drawing by the linking plates 30 seen edge-on. Similarly it is given stability in a direction parallel to the plane of the drawing by the pairs of plates seen face-on. The only play in the structure will be that due to the play in the hinges 31 and 33; this can be made so small as to be negligible.

A manhole 41 is provided in the top of the tank for access to the interior. The top plate is covered with timbers 42 of such depth that their top surfaces are level with the top surface of the manhole cover and the top edges of the angle bars 27.

In this example the tanks are placed in groups of four with a cat-walk between adjacent groups and, if desired, between a group and the hold wall (not shown). The cat-walk consists of removable timbers 43 supported by the frames 40 and its height is such that its top surface is flush with the top surfaces of the tanks when they are collapsed, thus forming a false deck. A main filling and emptying line 44 is laid on the hold floor 21 under the cat-walk. Branch lines 45 for the several tanks lead from unions 46 (only one is shown) on the main line 44. Each branch extends into the tank and has its mouth located parallel to the tank bottom and as near thereto as it can be placed without materially reducing its flow capacity. Each branch line 45 includes a control valve 47 provided with the usual handwheel 48 and an extension handwheel 49 for operation of the valve 47 from the cat-walk. Each tank is provided with an air vent 50 leading to the atmosphere through a hand-operated valve 51 and an automatic ventilating and liquid-sealing valve 52 provided with an anti-flash cover 53. The air vent 50 extends upwards to just below the level of the underside of the tank top when in the collapsed position.

As the tanks are filled air escapes through the air vents 50 until the liquid overflows into the vents and causes the valves 52 to close. Thereafter as more liquid is passed into the tanks they begin to expand upwards. The valves 51 can be closed at any time after the valves 52 have closed. When the tanks are to be emptied, the valves 47 and 51 are opened and the liquid is sucked out, the tanks collapsing as they empty. As the liquid level falls below the level of the air vent openings the liquid is sucked out of the air vents, the valves 52 open and air enters the tanks, thus permitting the remainder of the liquid to be sucked out. It is preferable to fill all the tanks at the same time, since the liquid will maintain a common level and the tanks will expand simultaneously.

It is often desirable to provide supports for preventing sideways movement of the tanks when in the extended position and these may consist of stanchion supports for the corners of the tanks, as shown in Figures 5 to 8, or sling supports as shown in Figures 9 and 10.

Figures 5 and 6 show a stanchion 54 of circular cross-section positioned to support corners of two tanks adjacent to a cat-walk. The stanchion is supported by a bottom socket 55 fixed to the hold floor 21 and a top socket 56 mounted on a bracket 57 fixed to supporting beams 58 of the hold roof 59. To place the stanchion in position its upper end is pushed fully home in the top socket, in which position its bottom end just clears the top edge of the bottom socket, the bottom end is then lowered into the bottom socket and is fastened by a pin 60. The frames 29 and the tank top are provided with guide slippers 61 whose edges fit against the stanchion. It will be apparent that such a stanchion can also be used at the centre of a group of tanks.

Figures 7 and 8 show a stanchion 62 of cruciform cross-section positioned at the centre of a group of four tanks. The stanchion is supported by a bottom socket 63 fixed to the hold floor 21 and is attached to a top bracket 64 which is fixed in the same way as the top socket 56. To place the stanchion in position the bottom end is inserted into the bottom socket 63, the top end is aligned with the top bracket 64 and a sliding collar 65 on the bracket is slid down until it rests on stops 66. The frames 29 and the tank top are provided with guide slippers 67 which are shaped to fit the longitudinal recesses of the stanchion. It will be apparent that such a stanchion, or a T-section stanchion, can be used at the side of a group of tanks between the group and the cat-walk.

It will also be apparent that the two methods of fastening the various types of stanchion can be interchanged.

Referring now to Figures 9 and 10, a suitable sling support consists of four slings 68 of chain or wire rope fastened at one end to eye bolts 69 fixed to the corners of the tank top and at the other end to a ring 70 fixed to the beams 58 by means of a beam clip 71 and a shackle 72. The slings 68 are provided with strainers 73.

Figure 10 shows the method of fixing the ring 70 when a beam 58 is not in a suitable position. A T-section girder 74 is fixed to the adjacent beams 58 with the foot of the T pointing downwards and a shackle 72 is used.

I claim:

1. A collapsible closed tank which is straight-sided in plan including a rigid bottom and a rigid top connected together by side walls capable of being folded into a plurality of superimposed pleats, rigid horizontal frames adapted to establish the outer folds of the pleats, means for establishing the inner folds of the pleats and for maintaining the frames in vertical alignment, and means to support the tank top when the tank is in the collapsed position consisting of a truss support structure standing on the bottom of the tank and adapted to be engaged directly by the tank top when the tank is in the collapsed position.

2. A collapsible closed tank which is straight-sided in plan including a rigid bottom and a rigid top connected together by side walls capable of being folded into a plurality of superimposed pleats, rigid horizontal frames adapted to establish the outer folds of the pleats, means for establishing the inner folds of the pleats and for maintaining the frames in vertical alignment, and means to support the tank top when the tank is in the collapsed position, consisting of support members attached to the tank top and projecting radially therefrom and truss support structures disposed on at least two sides of the tank and adapted to be engaged by said support members.

3. A collapsible closed tank which is straight-sided in plan including a rigid bottom and a rigid top connected together by side walls capable of being folded into a plurality of superimposed pleats, rigid superimposed horizontal frames of substantially similar linear dimensions to the rigid top adapted to establish the outer folds of the pleats and means for establishing the inner folds of the pleats and for maintaining the rigid frames in vertical alignment, consisting of pairs of rigid linking members distributed around the tank between each adjacent two frames, the two members of each pair being hinged to one another and to their respective rigid frame about hinges which have their axes horizontal and which provide substantially no play in directions parallel to the said horizontal axes.

4. A collapsible closed tank according to claim 3, wherein the hinge connecting each pair of linking members comprises means preventing movement of the said pair into a generally vertical plane beyond a predetermined position in which the hinge-connected ends of the two members are constrained to move inwards as the tank collapses.

DOUGLAS GEORGE UNTHANK.

REFERENCES CITED

The following references are of record in the file of this patent:

UNITED STATES PATENTS

| Number | Name | Date |
|---|---|---|
| 357,657 | Dodman | Feb. 15, 1887 |
| 754,222 | Lake | Mar. 8, 1904 |
| 875,266 | Howe et al. | Dec. 31, 1907 |
| 1,119,429 | Jetter | Dec. 1, 1914 |
| 1,161,336 | Potucek | Nov. 23, 1915 |
| 1,636,186 | Hickson | July 19, 1927 |
| 1,928,976 | Grasso | Oct. 3, 1933 |
| 2,019,636 | Scrantom | Nov. 5, 1935 |
| 2,171,567 | Jagschitz | Sept. 5, 1939 |
| 2,378,126 | Blair | June 12, 1945 |
| 2,391,374 | Wickstrum | Dec. 18, 1945 |
| 2,430,905 | Bradley | Nov. 18, 1947 |
| 2,476,531 | Berg | July 19, 1949 |
| 2,492,699 | Houwink | Dec. 27, 1949 |

FOREIGN PATENTS

| Number | Country | Date |
|---|---|---|
| 11,084 | Great Britain | Aug. 9, 1884 |
| 557,857 | Great Britain | Dec. 27, 1943 |